(No Model.)
F. McCARTY.
MILK CAN.
No. 583,000. Patented May 18, 1897.
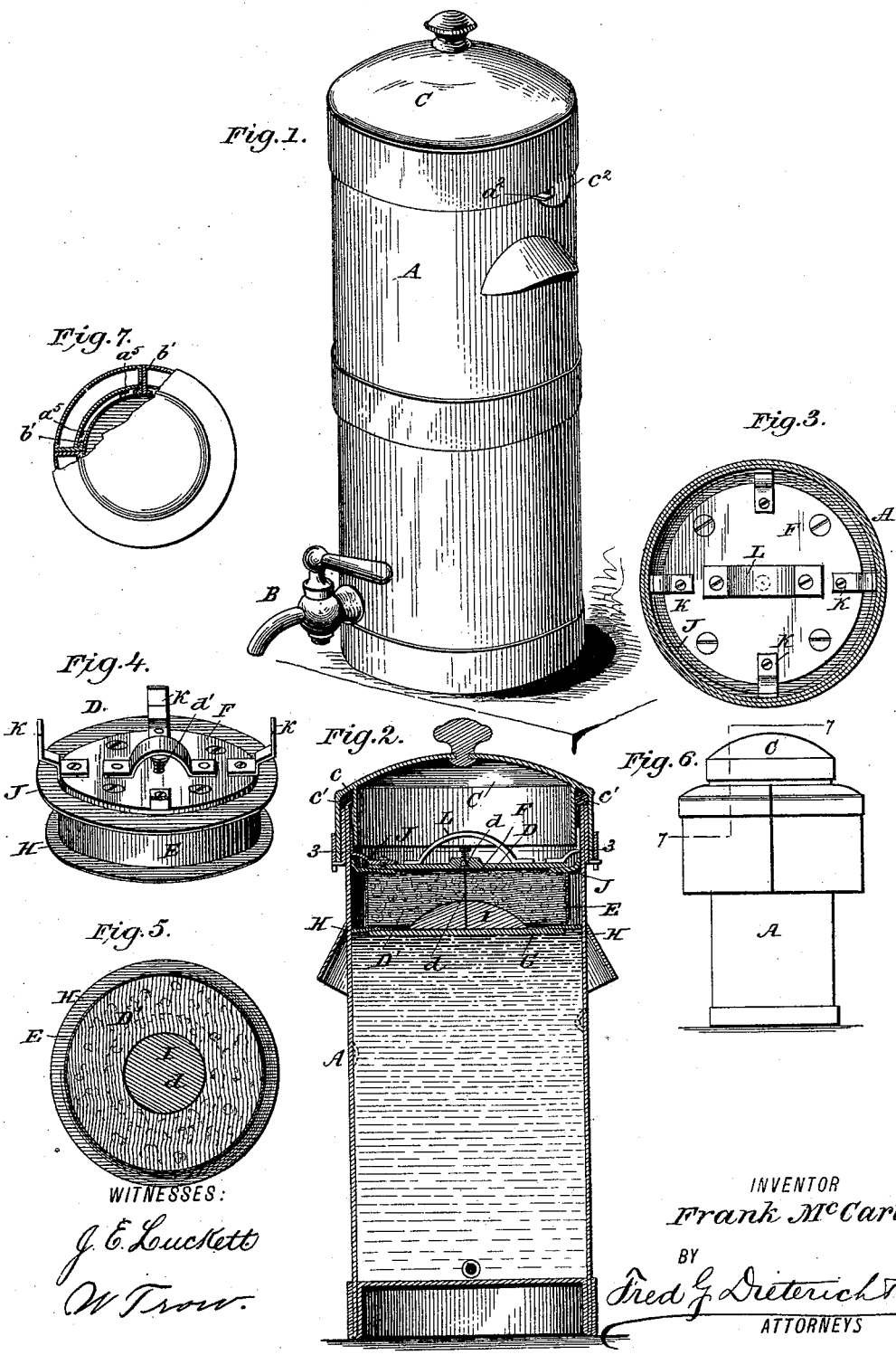
WITNESSES:
J. E. Luckett
W. Trow.
INVENTOR
Frank McCarty
BY
Fred G. Dieterich & Co.
ATTORNEYS

UNITED STATES PATENT OFFICE.

FRANK McCARTY, OF MARTIN'S FERRY, OHIO, ASSIGNOR OF TWO-THIRDS TO WM. HILTON AND A. W. HARRIS, OF SAME PLACE.

MILK-CAN.

SPECIFICATION forming part of Letters Patent No. 583,000, dated May 18, 1897.

Application filed August 24, 1896. Serial No. 603,770. (No model.)

*To all whom it may concern:*

Be it known that I, FRANK MCCARTY, residing at Martin's Ferry, in the county of Belmont and State of Ohio, have invented a new and Improved Milk-Can, of which the following is a specification.

My invention, which relates generally to improvements in milk-cans, more specifically refers to an improved follower-head which is adapted to follow the level of the milk as it is drawn off and thereby prevent the milk from splashing and churning while handling in transit or during standing of can when the milk is drawn off at intervals.

My invention also seeks to provide a follower-head which will operate to follow the milk down, even should the sides of the can be dented by careless handling during shipping.

Furthermore, my invention seeks to provide a follower-head which will be held airtight down on top of the milk and held from moving up in the can by the exterior air-pressure, whereby to keep the body of the milk within the can always in a space of the area of such body and practically cushion same from agitation.

With other objects in view, which will hereinafter be made clear, the invention consists in a milk-can embodying the peculiar arrangement and novel combination of parts such as will be first described in detail and then specifically pointed out in the appended claims, reference being had to the accompanying drawings, in which—

Figure 1 is a perspective view of my improved milk-can. Fig. 2 is a vertical section of the same. Fig. 3 is a horizontal section of the same, taken on the line 3 3 of Fig. 2, the top being removed. Fig. 4 is a perspective view of the follower-head. Fig. 5 is a horizontal section thereof. Fig. 6 shows my improved can provided with a detachable cooling-chamber, and Fig. 7 is a horizontal section taken on the line 7 7 of Fig. 6.

Referring to the accompanying drawings, A indicates the can-body, which is of the same diameter throughout its length and has at the lower end the discharge-nozzle B, and such body preferably has reinforce portions at upper and lower ends and centrally, and is provided with the usual lift members, as shown.

C indicates the can-top, which is made with a double rim whereby to provide an annular space $c$, adapted to fit over the upper edge $a$ of the can, such chamber having a packing or gasket $c'$, whereby the said cover C can be held down air-tight on the can, it having pendent hooks $c^2$, which are adapted to be moved into engagement with catch members $a^2$ on the can-body, as clearly shown in Fig. 1.

D indicates the follower-head, which consists of a body portion or disk D' of considerable less diameter than the can-body, as clearly shown in Fig. 2, for a purpose presently described.

The body or disk D' may be of wood or other material, but it is preferably made of cork, so as to give such body a proper buoyancy, the cork body being also preferred, as its expansive qualities are more nearly equal than that of wood. When such body is made of cork, its peripheral edge is covered with rubber or other non-absorbent material E, the ends of which are lapped over the upper and under edges of the disk D' and held fast by the metal washer-disks F and G, screwed or otherwise fastened to the disk-body D'.

H indicates a packing-ring secured on the under face of disk D' and held secure by the washer G, and J indicates a like ring secured on the top of the disk D' by washer F.

It will be noticed by reference to Figs. 2 and 4 that the lower ring H is of a diameter just equal or very slightly in excess of the diameter of the can-body, while upper ring J is of a considerably larger diameter than the said can-body, both rings J and H being, however, of a larger diameter than the disk D'.

So far as described it will be manifestly clear that by having the disk D' of a much less diameter than the body of the can and providing such disk with flexible extensions or packing-rings the follower-head can move up or down within the can, even when such body has one or more dents (see dotted line, Fig. 2) such as cans frequently receive when in transit.

The object in making the packing-rings J and H of different diameters and the upper one the larger is for the double purpose of cutting off the splashing or passage of milk up around the sides of the follower-head and onto the top thereof and also for forming a positive suction-packing, which is produced by the upper ring J, and thereby hold the head in place air-tight and making the head always follow the level of the milk and holding it practically compressed—that is, without room for splashing or churning, there being no air cushion or chamber between it, as the head is usually inserted on the top of the milk when the can is full.

To provide a positive means for drawing off any air which might be between the head D and the milk after the head is inserted, such head may have a very small air-opening $d$, having an automatically-closing valve $d'$, as shown, which in practice is so arranged that a slight finger-pressure will open the valve and let out the air under the head, it being obvious that such valve may be also opened to let in air under the head when it is desired to pull the same out of the can.

To provide a means for holding the head D positively to a true level position as it descends in the can, the disk D' is cut away on its under face centrally and weighted by a lead filling I, which is also held in place by the lower washer G, such head D also having angle-guides K on the upper side, which engage the side of the can, as shown, and serve to assist in holding the follower steady.

L indicates a handle member secured to the head D.

From the foregoing description, taken in connection with the accompanying drawings, it is thought the advantages of my invention will readily appear to those skilled in the art to which it appertains. It will be observed that while the lower packing-ring serves to effectively keep the milk from rising or splashing up between the head and can the upper packing-ring serves to keep out air and make a tight packing for the head D, which, as before stated, will move up or down in the body even when the sides are dented.

By referring now to Figs. 6 and 7 it will be noticed the body of the can is provided with suitable guides $a^5$ to receive hanger-flanges $b'$ on cooling or jacket cans or holders in which ice can be packed during warm weather to keep the milk at a proper temperature, such compartments having suitable cover-plates, as shown.

While I have shown my improvement as applied to a cylindrical body, it is obvious that the same may be used on a can-body square or of other shape in horizontal section.

Having thus described my invention, what I claim, and desire to secure by Letters Patent, is—

1. A milk-can having a follower-head formed of a solid body of less diameter than the can-body and having a packing-ring on its lower end of a diameter practically that of the can and a similar ring at the top of a greater diameter than the can as specified.

2. A follower-head for milk-cans having flexible packing members and a central air-passage having an automatically-closed valve as set forth.

3. The combination with the can of a follower-head formed of a cork body, a packing-ring secured to the top thereof of a larger diameter than the can-body and a flexible ring at the bottom of practically the same diameter as the can-body as set forth.

4. A milk-can having a follower-head formed of a disk portion formed of a floatable material, a weight held centrally in the lower face thereof, flexible rings held on the upper and lower faces of the disk, and washer members secured to the upper and lower faces of the disk adapted to hold the rings and the weight in position as described.

5. As a new article a follower for milk-cans consisting of a body portion having flexible rings or annular extensions at the top and bottom the upper one being of a larger diameter than the lower one, said body portion having an air-passage having an automatically-closing valve, substantially as shown and for the purposes described.

FRANK McCARTY.

Witnesses:
CHARLES E. RIORDON,
JOHN EDW. LUCKETT.